United States Patent [19]

Schilf

[11] Patent Number: 4,794,748

[45] Date of Patent: Jan. 3, 1989

[54] SEALING DEVICE FOR EXPANSION GAPS BETWEEN EVACUATED HEAT INSULATING WALL COMPONENTS

[75] Inventor: Lothar Schilf, Kirchlinteln, Fed. Rep. of Germany

[73] Assignee: Messerschmitt-Boelkow-Blohm Gesellschaft mit beschraenkter Haftung, Munich, Fed. Rep. of Germany

[21] Appl. No.: 102,388

[22] Filed: Sep. 29, 1987

[30] Foreign Application Priority Data

Oct. 8, 1986 [DE] Fed. Rep. of Germany ....... 3634347

[51] Int. Cl.⁴ .......................... E04B 1/62; B65D 87/24
[52] U.S. Cl. ........................................ 52/393; 52/573; 220/415; 220/901
[58] Field of Search ................. 52/393, 573, 267, 578, 52/249; 220/415, 445, 901

[56] References Cited

U.S. PATENT DOCUMENTS

| 2,769,212 | 11/1966 | Hammitt et al. | 52/509 |
| 3,091,817 | 6/1963 | Dosker | 52/509 |
| 4,050,608 | 9/1977 | Smith | 220/901 |
| 4,155,482 | 5/1979 | Swaney | 52/573 |
| 4,335,831 | 6/1982 | Swaney | 220/901 |

FOREIGN PATENT DOCUMENTS 97233 4/1964 Denmark ............................ 52/573

Primary Examiner—James L. Ridgill, Jr.
Attorney, Agent, or Firm—W. G. Fasse; D. H. Kane, Jr.

[57] ABSTRACT

Expansion gaps formed between bellows type side walls of evacuated heat insulating wall components of gas and pressure-tight containers are sealed by elastically deformable corrugated expansion sheet metal strips welded to the surfaces of neighboring wall components, and by specially shaped junction covers secured in a gas-tight manner to the wall components and to the strips. The covers have a central cavity and ondulating depressions merging into corrugations of the sheet metal strips. The expansion gaps are also evacuated and filled with a suitable insulating material. Mechanically loadable support elements may be located in the expansion gaps.

16 Claims, 1 Drawing Sheet

SEALING DEVICE FOR EXPANSION GAPS BETWEEN EVACUATED HEAT INSULATING WALL COMPONENTS

FIELD OF THE INVENTION

The invention relates to a sealing device for expansion gaps between evacuated heat insulating wall components, for example, of heat insulated containers, whereby the wall components rest with one side or surface area against a gas-tight pressure resistant wall, such as a container wall.

DESCRIPTION OF THE PRIOR ART

Vacuum insulation techniques are known in the art. These techniques permit obtaining heat insulating characteristics which are far superior to those of other conventional heat insulation materials, for example, mineral wool, foam materials, and so forth. When insulating larger structures, for example containers or pipelines, it becomes necessary, due to manufacturing and economic reasons, to assemble the insulation structure of several individual components which are mostly available as panel type wall components. Normally, such panel type heat insulating wall components comprise a metallic pressure-tight or vacumm envelope which has the disadvantage that its side walls or facing edge walls function as undesired heat bridges. In order to make the heat loss through these bridges as small as possible, it is known to reduce the wall thickness of the envelope of each individual wall component in the edge zone and to make the length of the edge walls from one sheet metal envelope section to the opposite sheet metal envelope section as long as possible. This lengthening of the side walls is accomplished by forming these side walls around the edges of each individual wall component as a bellows. Due to this construction or structure of the wall component side walls, it is unavoidable that hollow spaces are formed between neighboring heat insulating wall components. Additionally, it is necessary to take into account tolerances in the shape of each individual wall component as well as an unhindered heat expansion. Thus, certain minimal spacings must be maintained between the edges of the envelope sections of neighboring wall components. These minimal spacings form gaps between neighboring wall components. These gaps are referred to as heat expansion gaps. If the heat expansion gaps are not insulated, they would substantially decrease the heat insulating characteristics of the entire container or the like. Such decrease of the heat insulating characteristics is not permissible.

In order to avoid heat loss through the heat expansion gaps, it is known to fill the heat expansion gaps with conventional heat insulating material such as mineral wool or the like and to close the gaps on the side facing the medium that must be kept at predetermined temperatures. The closing of the gaps must be accomplished in a vacuum-tight elastic manner so as not to diminish the required characteristics of the heat expansion gap. In spite of the conventional efforts to properly close and insulate these heat expansion gaps, it has so far been unavoidable that the gaps have poorer expansion characteristics than the neighboring heat insulating wall components.

OBJECTS OF THE INVENTION

In view of the foregoing it is the aim of the invention to achieve the following objects singly or in combination:

to provide a sealing device for heat expansion gaps between evacuated heat insulating wall components which assures heat insulating characteristics for the gaps comparable to those of the wall components so that the overall heat insulation effect is substantially the same as that of a completely gapless vacuum heat insulation system;

to provide gap covering elastically deformable sheet metal strips and junction covers compatible with the sheet metal strips for assuring a vacuum-tight seal of the heat expansion gaps and the junctions between joining gaps and crossing gaps; and to make the sheet metal strips and the covers of material that is compatible with the surface covering sections of the heat insulating wall components so that the joining of the strips and sections and covers may, for example, be accomplished by welding or brazing.

SUMMARY OF THE INVENTION

The sealing device according to the invention is characterized in that the gaps are covered on the side away from the pressure resistant wall, with elastically deformable sheet metal strips which are secured to the evacuated heat insulating wall elements in a gas-tight manner. The spaces forming the expansion gaps are evacuated and filled either only with a pourable or fibrous or porous and pressure resistant insulating material, or they are filled partially with such insulating materials and partially with heat insulating support bodies capable of taking up mechanical loads. The support bodies underpin the edges of neighboring wall components and are made of heat insulating material capable of taking up mechanical loads.

According to the invention junctions or joints of the gaps are covered by sheet metal covers which are shaped to be compatible for joining to the elastically deformable gap covering strips of sheet metal. Thus, the gaps and their junctions or joints are covered by elastically expandable sheet metal strips and covers in a gas-tight manner so that the gaps can be evacuated and these sheet metal strips and covers are capable of taking up substantial mechanical and thermal loads. The combination of strips and covers with insulating material filled into the gaps and junctions enables the gap closing structure to compensate or take up the high cross or shearing forces which are generated by the pressure difference, for example, between the inside and outside of a container. The hollow space of the gap is either filled completely with a pourable or fibrous, or porous heat insulating material capable of taking up compression loads or it is filled with such material and with solid support bodies also made of heat insulating material and capable of taking up compression loads for supporting the flexible strips and covers.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
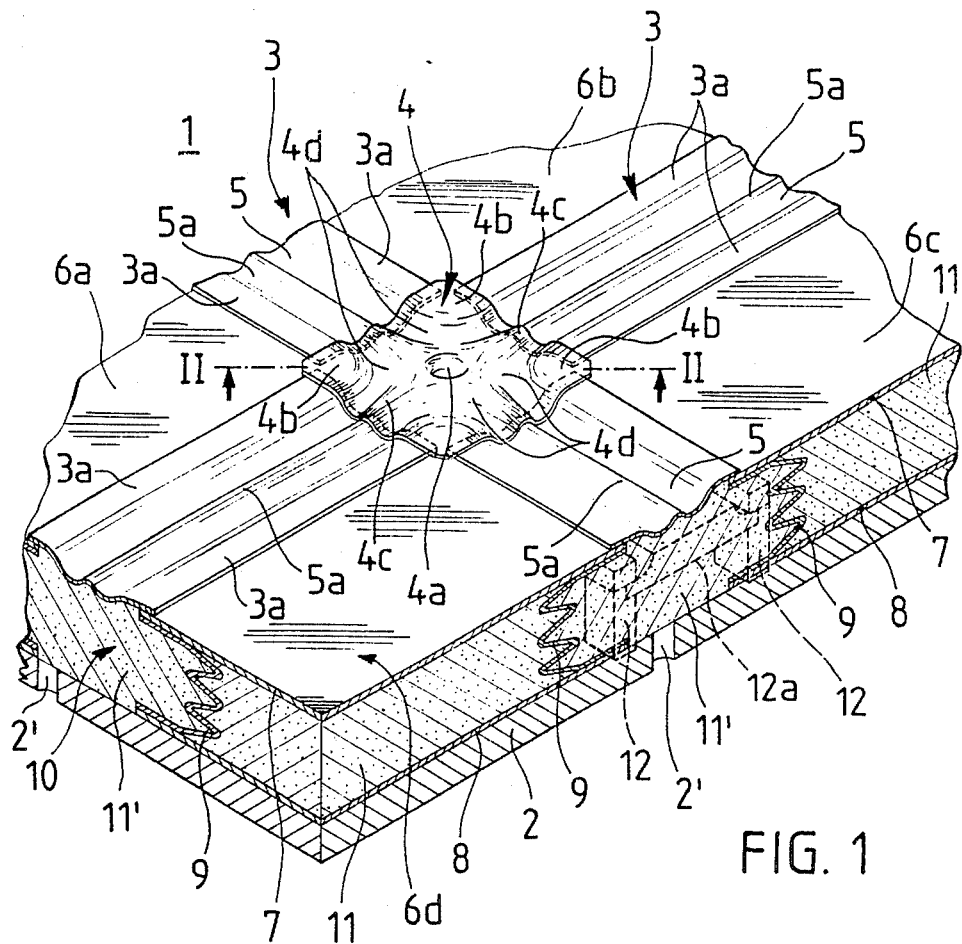
FIG. 1 is a perspective view of four heat insulating wall components shown partially in section and partially broken away and illustrating the present sealing device for the expansion gaps.

FIG. 1 shows four evacuated heat insulating wall components 6a, 6b, 6c, and 6d which form part of a larger wall structure. Each wall component is enclosed by a lower cover sheet metal section 8 and by an upper cover sheet metal section 7 and between bellows type side walls 9. The sections 7 and 8 are connected to the bellows side walls 9 in a pressure-tight and gas-tight manner so that each of these wall components may be evacuated through closable apertures 2' in a gas-tight pressure resistant wall 2.

The wall 2 may, for example, be an outer wall of a container, the inside of which is insulated by the wall components 6a, 6b, 6c, 6d. Although the base wall 2 is shown as a plane wall the invention is not limited to such a structure. The present invention is equally applicable to any other shape, for example, if the container is cylindrical or spherical or the like.

The space enclosed by the cover sections 7 and 8 and by the side wall bellows 9 is filled with a flowable, porous and pressure resistant insulating material 11 such as kieselguhr or perlite or a pourable synthetic granular silica. Thereafter, the so formed wall components are evacuated through the openings 2' which are then closed again in a vacuum-tight manner.

Due to the manufacturing tolerances and due to dimensional changes resulting from temperature variations, it is necessary that the wall components 6a . . . are spaced from each other by a certain spacing forming heat expansion gaps 10 which may cross each other at an intersection or which may join each other in a T-junction. Normally, the expansion gaps extend at right angles to each other. According to the invention the longitudinal gap portions are covered by elastically deformable sheet metal strips 3 having corrugated type valleys 5 and ridges 5a which enable these strips 3 to elastically yield in response to temperature variations and tolerance differences. The strips have longitudinal edges 3a secured in a vacuum-tight manner to the respective wall component, more specifically, to the sheet metal cover section 7, for example, by welding or brazing or the like.

The intersection of two expansion gaps 10 is closed by a cover 4 which is curved in space so that the corrugations of the strips 3 may properly be joined to the cover 4, for example, by welding, without any notching effect. For this purpose, the cover 4 has a central cavity 4a and raised corner portions 4b. Additionally, the cover 4 has radially outwardly extending ridges extending away from said cavity 4a. Curved valleys 4d partially encircle the respective corner portion 4b so that the valleys 4d extend between the ridges and the corresponding corner portion. The just described configuration of the cover 4 enables an elastic yielding to accommodate dimensional changes in the expansion gap and to simultaneously cooperate with the strips 3 to which the covers are welded in a pressure-tight manner. It has been found that the corrugated configuration of the strips 3 merging into the described shape of the cover 4 enables the strips 3 and the cover 4 to yield in an elastic manner, yet in a certain limit range which is sufficient to compensate for changes in the gap width and in the intersection dimensions. The central cavity 4a and the ridges 4c, as well as the valleys 4d have radii of sufficient size so that notching effects are avoided. This is an important advantage because notching effects could be the start of a fracture.

Where the intersection is a T-junction, one side of the cover 4 could be cut off and the so shortened side could be closed off by an angled sheet metal section having an L-cross-sectional configuration so that three strips 3 could merge into such a T-junction cover. Similarly, the shown cover 4 may be modified to cover three, five, or more expansion gaps merging radially into a respective junction.

The volumes or hollow spaces formed by the expansion gaps 10 are filled with a flowable insulating material 11' which is preferably of the same type as the insulating material 11 of the wall component 6a, 6b, 6c, and 6d. In those instances where an especially high internal container pressure must be taken up by the insulating structure, it is suggested that rigid support bodies 12 also made of heat insulating material are placed inside the gaps possibly surrounded by the other insulation 11' as shown in FIG. 1. The support bodies 12 underpin the edges 3a and thus the edges of the cover sections 7 relative to the outer wall 2. These bodies 12 are capable of taking up substantial mechanical loads. Two underpinning bodies 12 may carry a crossbeam type of bridging member 12a which supports the respective strip 3. This bridging member 12a prevents an undesirable buckling of the strips 3 so that these strips 3 and covers 4 can be overloaded. The evacuation of the hollow spaces of the expansion gaps 10 is performed, as mentioned above, through closable openings 2' in the wall 2. These openings 2' make it possible to perform tests when the system is in operation to see whether the required vacuum seals are maintained throughout the insulating structure.

Figure 2:
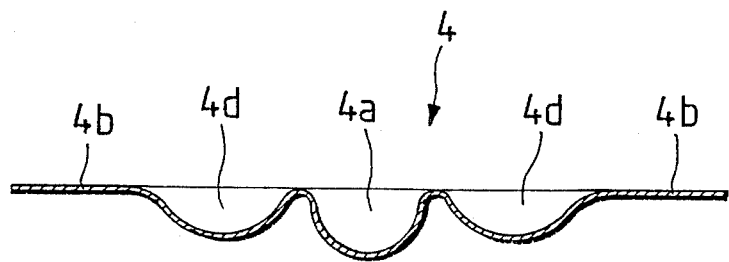
FIG. 2 is a sectional view along section line II—II in FIG. 1, whereby the section extends only through the junction cover according to the invention, but not through the entire wall structure.

The sectional view of FIG. 2 shows only the cover 4 constructed as a sheet metal expansion member. Each corner 4b forms a flat portion that rests on the neighboring flat margin 3a of the respective expansion strip 3. A tipped portion at each corner may be depressed downwardly to also contact the surface of the respective sheet metal wall section 7 of the wall components for a pressure-tight and vacuum-tight welding operation. The radii of the ridges 4c and of the valleys 4d as well as of the central cavity 4a are so selected that undesirable steep changes in the stiffness of the entire cover are avoided. Further, so-called notching effects are also avoided by the smooth transition of one zone of the cover 4 into a neighboring zone. To simplify the illustration, the cover 4 is shown alone in FIG. 2 without the other elements of the insulating wall structure.

Although the invention has been described with reference to specific example embodiments, it will be appreciated, that it is intended to cover all modifications and equivalents within the scope of the appended claims.

What I claim is:

1. An enclosure construction for holding fluids, comprising individual enclosure wall components each having side walls and edge walls interconnected in a pressure-tight manner to form first vacuum-tight spaces, pressure resistant heat insulation material in said first vacuum-tight spaces, said edge walls of neighboring enclosure wall components facing each other across an expansion gap formed between two neighboring edge walls, a gas-tight pressure resistant wall, means securing said enclosure wall components to said gas-tight pressure resistant wall to form said expansion gaps, expansion gap sealing means comprising an elastically deformable sheet metal strip covering said expansion gap opposite said pressure resistant wall, said sheet metal strip having lateral edges secured in a vacuum-tight to said enclosure wall components opposite said pressure resistant wall for forming second vacuum-tight spaces in said expansion gaps for maintaining a low pressure or vacuum in said gap, pressure resistant heat insulating material in said gap, and means (2') for establishing said low pressure or vacuum inside said first spaces in said enclosure wall components and inside said second spaces in said expansion gaps to keep said enclosure wall components and said expansion gaps under said low pressure or vacuum.

2. The enclosure of claim 1, wherein said pressure resistant heat insulating material is a flowable type of heat insulating material.

3. The enclosure of claim 1, wherein said pressure resistant heat insulating material is a fibrous heat insulating material.

4. The enclosure construction of claim 1, wherein said pressure resistant heat insulating material is a porous heat insulating material.

5. The enclosure of claim 1, wherein said pressure resistant heat insulating material is a pourable kieselguhr.

6. The enclosure construction of claim 1, wherein said pressure resistant heat insulating material is a pourable perlite.

7. The enclosure construction of claim 1, wherein said pressure resistant heat insulating material is a pourable synthetic granular silica.

8. The enclosure construction of claim 1, further comprising support means in said gap for underpinning edges of said neighboring wall components, said support mean being made of heat insulating material capable of taking up mechanical loads.

9. The enclosure construction of claim 1, wherein said wall components comprise corrugated wall sections (9) forming bellows type side walls for said expansion gaps.

10. The enclosure construction of claim 1, wherein said gas-tight pressure resistant wall is a container wall, said heat insulating wall components being placed against an inner surface of said container wall, said container wall having closable openings therein for evacuating said gap.

11. The enclosure construction of claim 10 wherein said gas-tight pressure resistant container wall is a container wall lining.

12. The enclosure construction of claim 1, wherein said neighboring wall components comprise metal cover sheets, said elastically deformable sheet metal strip being made of a metal that is compatible with said metal cover sheets for welding said elastically deformable sheet metal strip to said metal cover sheets.

13. The enclosure construction of claim 12, further comprising a junction cover for closing a junction between two gaps, said junction cover having a configuration curved in space with radii of curvature which are sufficiently large for merging into said expansion fold without said notching effect.

14. The enclosure construction of claim 13, wherein said cover is formed to close an intersection of two gaps.

15. The enclosure construction of claim 13, wherein said cover is formed to close a T-junction between two gaps.

16. The enclosure construction of claim 13, wherein said cover has a central cavity, ridges extending radially outwardly from said central cavity, valleys curving from one side to another side of said cover between two ridges, and raised corner portions partially encircled by a respective valley, said ridges and valley merging with said fold of the respective elastically deformable sheet metal strip.

* * * * *

UNITED STATES PATENT AND TRADEMARK OFFICE
CERTIFICATE OF CORRECTION

PATENT NO. : 4,794,748
DATED : January 3, 1989
INVENTOR(S) : Lothar Schilf

It is certified that error appears in the above-identified patent and that said Letters Patent is hereby corrected as shown below:

In claim 1, column 5, line 7, after "vacuum-tight" insert --manner--;

In claim 2, column 5, line 18, after "enclosure" insert --construction--;

In claim 3, column 5, line 21, after "enclosure" insert --construction--;

In claim 5, column 5, line 27, after "enclosure" insert --construction--;

In claim 11, column 6, line 11, after "10" insert --,--.

Signed and Sealed this

Ninth Day of May, 1989

Attest:

DONALD J. QUIGG

Attesting Officer

Commissioner of Patents and Trademarks